(12) United States Patent
Error et al.

(10) Patent No.: US 7,761,457 B2
(45) Date of Patent: Jul. 20, 2010

(54) CREATION OF SEGMENTATION DEFINITIONS

(75) Inventors: Christopher Reid Error, Orem, UT (US); Brett Michael Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 428 days.

(21) Appl. No.: 11/313,445

(22) Filed: Dec. 20, 2005

(65) Prior Publication Data

US 2006/0277585 A1    Dec. 7, 2006

Related U.S. Application Data

(60) Provisional application No. 60/688,211, filed on Jun. 6, 2005, provisional application No. 60/688,076, filed on Jun. 6, 2005.

(51) Int. Cl.
*G06F 17/30* (2006.01)
(52) U.S. Cl. .................. 707/754; 707/752; 707/753
(58) Field of Classification Search ............ 707/3, 707/10, 100
See application file for complete search history.

(56) References Cited

U.S. PATENT DOCUMENTS

| | | | |
|---|---|---|---|
| 5,760,772 A | 6/1998 | Austin | |
| 5,796,402 A | 8/1998 | Ellison-Taylor | |
| 5,821,931 A | 10/1998 | Berquist et al. | |
| 5,835,087 A | 11/1998 | Herz et al. | |
| 5,870,559 A | 2/1999 | Leshem et al. | |
| 5,966,139 A | 10/1999 | Anupam et al. | |
| 6,008,809 A | 12/1999 | Brooks | |
| 6,026,397 A | 2/2000 | Sheppard | |
| 6,182,097 B1 | 1/2001 | Hansen et al. | |
| 6,188,405 B1 | 2/2001 | Czerwinski et al. | |
| 6,266,649 B1 | 7/2001 | Linden et al. | |
| 6,310,631 B1 | 10/2001 | Cecco et al. | |
| 6,393,479 B1 | 5/2002 | Glommen et al. | |
| 6,414,677 B1 | 7/2002 | Robertson et al. | |
| 6,470,335 B1 | 10/2002 | Marusak | |
| 6,473,102 B1 | 10/2002 | Rodden et al. | |
| 6,489,968 B1 | 12/2002 | Ortega et al. | |
| 6,654,036 B1 | 11/2003 | Jones | |

(Continued)

FOREIGN PATENT DOCUMENTS

WO       WO 00/58866       10/2000

(Continued)

OTHER PUBLICATIONS

Supplementary European Search Report, EP 04717485, Nov. 7, 2006, 3 pages.

(Continued)

*Primary Examiner*—Baoquoc N To
(74) *Attorney, Agent, or Firm*—Robert C. Kowert; Meyertons, Hood, Kivlin, Kowert & Goetzel, P.C.

(57) ABSTRACT

A system and method for defining a segment for filtering website visitation data is disclosed. The method allows for creation and editing of a segment using various rules. The rules are defined using events and containers, which act as criteria by which the data is filtered. The system displays the segments and allows the user to apply them to stored data.

20 Claims, 12 Drawing Sheets

U.S. PATENT DOCUMENTS

| | | |
|---|---|---|
| 6,671,711 B1 | 12/2003 | Pirolli et al. |
| 6,704,016 B1 | 3/2004 | Oliver et al. |
| 6,754,873 B1 | 6/2004 | Law et al. |
| 6,766,370 B2 | 7/2004 | Glommen et al. |
| 6,850,988 B1 | 2/2005 | Reed |
| 6,862,574 B1 | 3/2005 | Srikant et al. |
| 6,950,993 B2 | 9/2005 | Breinberg |
| 6,963,874 B2 | 11/2005 | Kasriel et al. |
| 6,968,511 B1 | 11/2005 | Robertson et al. |
| 6,980,962 B1 | 12/2005 | Arganbright et al. |
| 7,161,487 B1* | 1/2007 | Tracey et al. ............ 340/572.1 |
| 2001/0049671 A1* | 12/2001 | Joerg ............................ 706/50 |
| 2002/0040395 A1 | 4/2002 | Davis et al. |
| 2002/0042750 A1 | 4/2002 | Morrison |
| 2002/0087621 A1 | 7/2002 | Hendriks |
| 2002/0091591 A1 | 7/2002 | Tsumura et al. |
| 2002/0093529 A1 | 7/2002 | Daoud et al. |
| 2002/0099812 A1 | 7/2002 | Davis et al. |
| 2002/0152284 A1 | 10/2002 | Cambray et al. |
| 2002/0165936 A1 | 11/2002 | Alston et al. |
| 2002/0186237 A1 | 12/2002 | Bradley et al. |
| 2002/0186253 A1 | 12/2002 | Rodden et al. |
| 2002/0198939 A1 | 12/2002 | Lee et al. |
| 2003/0023712 A1 | 1/2003 | Zhao et al. |
| 2003/0025737 A1 | 2/2003 | Breinberg |
| 2003/0055883 A1 | 3/2003 | Wiles, Jr. |
| 2003/0128231 A1 | 7/2003 | Kasriel et al. |
| 2003/0131097 A1 | 7/2003 | Kasriel et al. |
| 2004/0049417 A1 | 3/2004 | Nickerson et al. |
| 2004/0059746 A1 | 3/2004 | Error et al. |
| 2004/0070606 A1 | 4/2004 | Yang et al. |
| 2004/0133671 A1 | 7/2004 | Taniguchi |
| 2004/0205157 A1 | 10/2004 | Bibelnieks et al. |
| 2005/0044508 A1 | 2/2005 | Stockton |
| 2005/0108625 A1 | 5/2005 | Bhogal et al. |
| 2005/0204307 A1 | 9/2005 | Nadal |
| 2005/0229110 A1 | 10/2005 | Gegner et al. |
| 2005/0235222 A1 | 10/2005 | Barbanson et al. |
| 2005/0246283 A1* | 11/2005 | Gwiazda et al. ............... 705/52 |
| 2005/0273727 A1 | 12/2005 | Barbanson et al. |
| 2006/0026147 A1* | 2/2006 | Cone et al. ..................... 707/3 |
| 2006/0085132 A1* | 4/2006 | Sharma et al. ................. 702/1 |

FOREIGN PATENT DOCUMENTS

| | | |
|---|---|---|
| WO | WO 02/23438 A2 | 3/2002 |

OTHER PUBLICATIONS

U.S. Appl. No. 10/113,808, filed Mar. 29, 2002, Wiles, Jr.
U.S. Appl. No. 10/113,322, filed Mar. 29, 2002, Zhao et al.
U.S. Appl. No. 10/057,513, filed Jan. 25, 2005, Alston et al.
U.S. Appl. No. 09/835,112, filed Apr. 13, 2001, Cambray et al.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
PCT International Search Report and Written Opinion, PCT/US06/21937, Sep. 25, 2007, 8 pages.
PCT International Search Report and Written Opinion, PCT/US06/21978, Sep. 4, 2007, 8 pages.
Chinese Office Action, Chinese Application No. 200680026305.3, Mar. 27, 2009, 4 pages.
Extended European Search Report, European Application No. 06772307.2, Jan. 12, 2009, 9 pages.
"WebTrends 7 Report User's Guide," Mar. 2005, pp. I-VIII, 1-82, [Online] [Retrieved on Dec. 15, 2008] Retrieved from the Internet<URL:http://product.webtrends.com/WRC/7.1/Documents/ReportUsersGuide.pdf>.
"WebTrends Guide to Web Analytics," Jan. 2005, pp. I-X, 1-224, [Online] [Retrieved on Dec. 15, 2008] Retrieved from the Internet<URL:http://product.webtrends.com/WRC/7.1/Documents/WebAnalytics.pdf>.
Chinese Office Action, Chinese Application No. 2006800278491, Apr. 10, 2009, 12 pages.

* cited by examiner

CREATION OF SEGMENTATION DEFINITIONS

RELATED APPLICATIONS

This application claims priority under 35 U.S.C. §119 from U.S. Provisional Application Ser. No. 60/688,211, filed Jun. 6, 2005 by Christopher R. Error et al., entitled "User Interface for the Creation of Segmentation Definitions in a Web Analytic Tool," and is related to U.S. Provisional Application Ser. No. 60/688,076, filed Jun. 6, 2005 by Chris Error et al., entitled "Website Traffic Analysis Engine and User Interface, ", each of which is incorporated herein in its entirety by reference.

BACKGROUND OF THE INVENTION

1. Field of the Invention

This invention relates generally to user interfaces for tools relating to queries on data in a database. More particularly, the present invention relates to interfaces for generating segment definitions or filter criteria that can be applied to a data set and used by web analytics tools.

2. Background of the Invention

Web analytics refers to the analysis of data created by website usage. For instance, web analytics can be used to mine visitor traffic data. A variety of visitor traffic data is measured such as what browser is being used, what links on a given web page were selected, whether a product was purchase, etc. There are number of web analytics tools presently available such as Site Catalyst version 11 from Omniture of Orem, Utah. These tools are able to capture data on website usage, and responsive to a user's request, display a variety of different metrics on website usage such as fallout/conversion, A/B testing, etc.

One problem with such existing tools is that typically they require a programmer be involved to generate reports and filter the data into segments that the user is interested in viewing. If a user wants to view the data in a different way by creating or modifying a segment definition, the user must provide an explanation of what is desired to a programmer who in turn translates that explanation into data understandable by the web analytics tool, such as code, rules sets, or the like. In addition to requiring additional communication and interfacing between the programmer and the user, this process is typically time consuming and does not allow the user to change or redefine the segmentation definitions on demand.

Thus, there is a need for an improved method and system for web analytics tools that solves the above shortcomings of the prior art.

SUMMARY OF THE INVENTION

The present invention as described herein is a system and method for defining a segment for filtering website visitation data. The method includes displaying a plurality of events and containers as criteria by which the website visitation data may be filtered and a canvas, as defined herein, for defining a segment. Events and containers are typically variables that act as criteria by which the data may be filtered. Events may be any activity that occurs in a users visiting or viewing of web pages, and data criteria that is stored in a data storage. For example, a rule saying "product equals radio" is easy to understand, but the scope of that rule is more difficult. Do you want only orders where product equals radio, do you want the entire visit where product was radio, or do you want all pages seen—i.e. the visitor—by anyone who ever saw a radio. Containers may be any criteria for bounding the rule or may act as a node in a hierarchical tree structure. The method further allows for receiving user input selecting events and containers to include in a segment and for displaying the relationship between selected events and containers as a rule.

DETAILED DESCRIPTION

The present invention is a system and method for generating a graphical or text-based user interface for a web analytics tool that allows for the creation and modification of segmentation definitions. While the present invention is described in the context of creation and modification of segmentation definitions for web analytics tools, those skilled in the art will recognize that the present invention may have various other applications, such as a user interface for generating queries on relational databases. The context in which the present invention is described is only for convenience and ease of understanding, and not to limit the scope of the present invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Coupling, as used herein, refers to communicative coupling, which may or may not be a physical attachment in the various embodiments.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
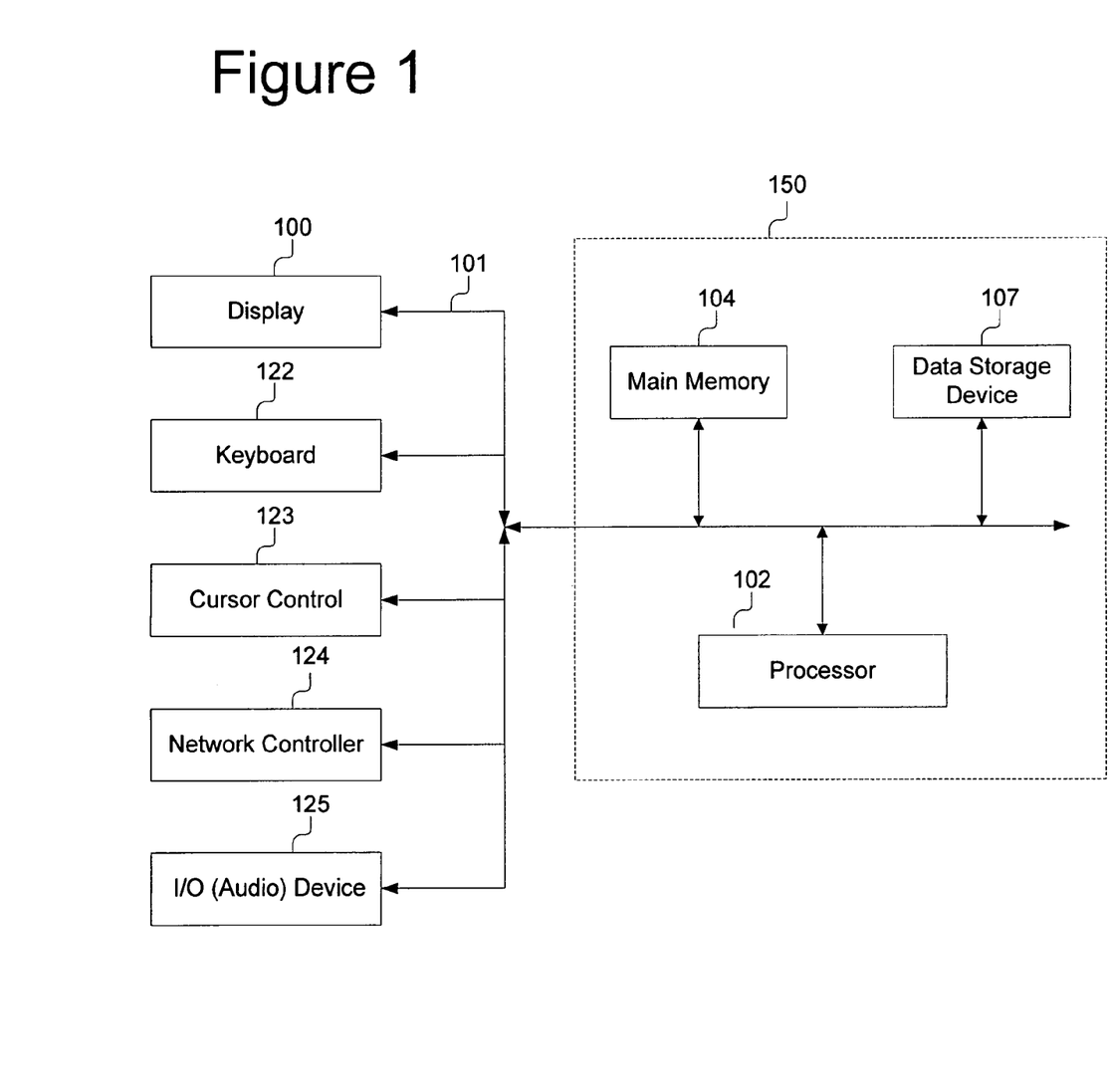
FIG. 1 is a block diagram of a system for operating the web analytics tool of the present invention.

FIG. 1 is a block diagram of one embodiment of the system. While the present invention will now be described in the context of a von Neumann architecture, it should be understood that one embodiment of the present invention divides functionality in a client/server architecture. Referring to FIG. 1, the system is shown as including a control unit 150, a display 100, a keyboard 122, a cursor controller 123, a network controller 124, and an audio device 125. The control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 2. In particular, the portions of the memory 104 for providing the user interface for segmentation definition are shown in detail.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 101 include display device 100, keyboard 122, cursor control device 123, network controller 124, and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

One or more I/O devices 125 are coupled to the system bus 101. For example, the I/O device 125 may be an audio device 125 equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose, audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 1 without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Figure 2:
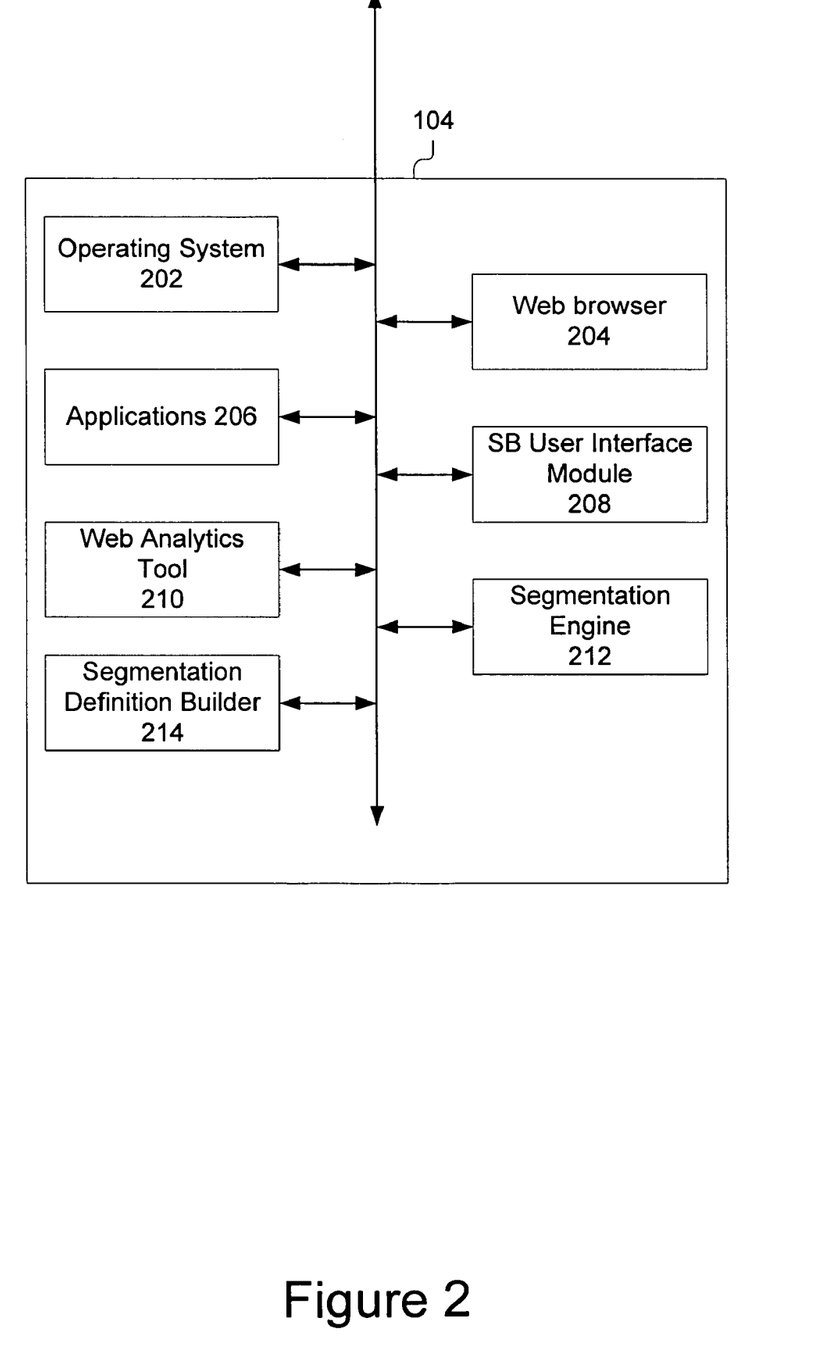
FIG. 2 is block diagram of one embodiment of the memory of the system of FIG. 1.

FIG. 2 illustrates one embodiment of memory 104 of the present invention including operating system 202, a web browser 204, applications 206, a segmentation builder user interface module 208, a web analytics tool 210, a segmentation engine 212, and a segmentation definition builder 214.

The operating system 202 in one embodiment is one of a conventional type such as, WINDOWS®, SOLARIS®, or LINUX® based operating systems.

The web browser 204 is of a conventional type that provides access to the Internet and processes HTML, XML, or other mark up language to generated images on the display device 100. For example, the web browser 204 could be Mozilla Firefox or Microsoft Internet Explorer.

The memory unit 104 also includes one or more application programs 206 including, without limitation, word processing applications, electronic mail applications, spreadsheet applications, and web browser applications.

The memory also includes a web analytics tool 210 such as Site Catalyst version 11 from Omniture of Orem, Utah. Such a tool 210 is disclosed in co-pending provisional patent application titled "Website Traffic Analysis Engine and User Interface," Ser. No. 60/688,076 by Chris Error et al., filed Jun. 6, 2005 which is incorporated by reference in its entirety.

The segmentation builder user interface module 208 in one embodiment is a module for generation of graphical or text-based user interfaces that allows the user to define the filters or segment definitions that will be applied to a web analytics data store to produce data sets that are in turn used by the workbench portion of the web analytics tool 210. In addition, the interface displays to the user the relationship between events and containers making up the segment, as those terms are defined within this document. This function provides the ability to provide an interface that is intuitive, easy to use, and can be used by a layperson to extract the desired data from a data store. The segmentation builder user interface module 208 provides a variety of displays as will be described below with reference to FIGS. 4-8 according to one embodiment of the present invention. The segmentation builder user interface module 208 provides a drag-and-drop interface with partially defined filters that can be placed on a canvas. A canvas, as used herein, may be a graphical display of the filters, or may be a text-based, e.g., hierarchical, display of the filters, according to various embodiments of the present invention. Based on their position on the canvas, nesting and other relationships for a variety of logical functions between the filters is provided. The segmentation builder user interface module 208 is coupled to receive input from the user and translate it into information that can be output to and used by the segmentation definition builder 214 to create a segmentation definition.

In one embodiment, the segmentation builder user interface module 208 provides functionality for displaying components for inclusion as a rule in a segment, displaying a canvas for defining the segment, receiving input for modification of a segment, displaying modified segments, saving segments, clearing the canvas, and applying the segment to stored data.

The segmentation engine 212 is a module that generates a data set based on input data source and a segmentation or rule definition. The segmentation engine 212 is coupled to a data source. A non-exhaustive list of exemplary data sources includes data warehouses, databases, and data files. The data source may be available via a network connection or may be stored on a data storage device 107 coupled by the bus 101 to the segmentation engine 212. The segmentation engine 212 applies a segmentation definition, or rule to the data source with the result being a data set that can be used by the web analytics tool 210.

The segmentation definition builder 214 is a module that translates input from segmentation builder user interface module 208 into instructions for the segmentation engine 212. The segmentation definition builder 214 effectively builds a segmentation definition that can be provided to the segmentation engine 212 and when run by the segmentation engine 212 on the data source produces the data set desired. The segmentation definition builder 214 is coupled to the segmentation builder user interface module 208 and the segmentation engine 212.

Figure 11:
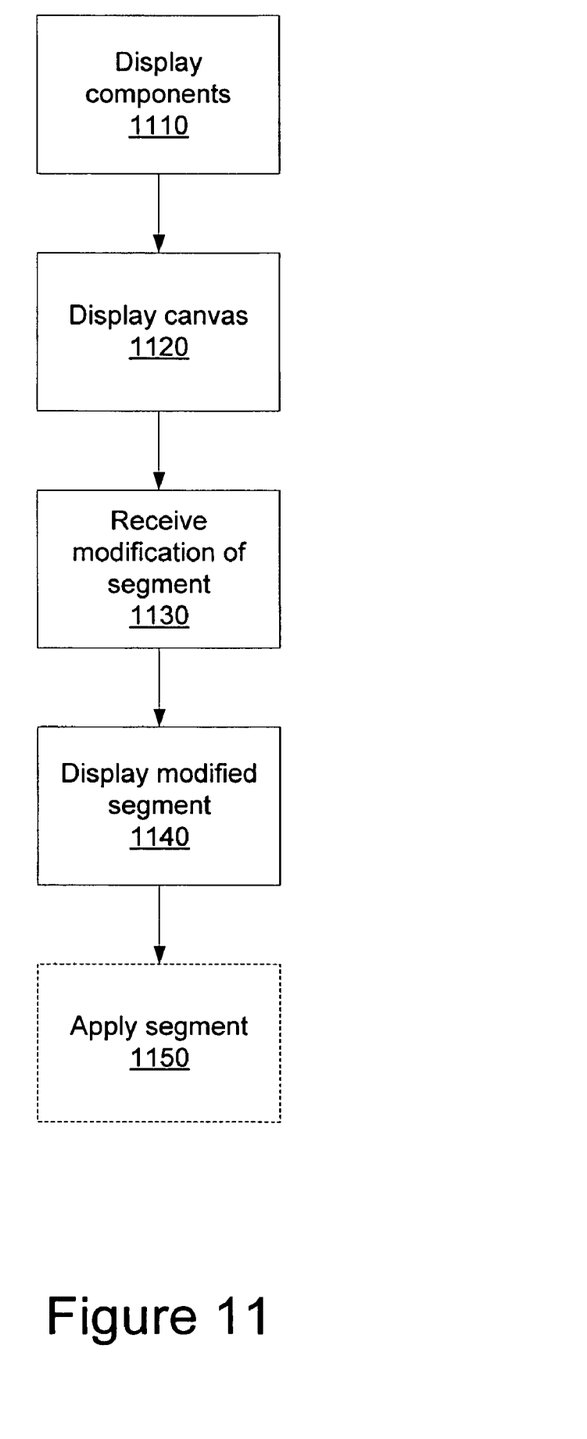
FIG. 11 is a flow chart of steps for creating and editing a segment for filtering website visitation data according to one embodiment of the present invention.

Referring now to FIG. 11, it shows a flow chart of steps for creating and editing a segment for filtering website visitation data according to one embodiment of the present invention.

The process begins with displaying components 1110 for inclusion as a rule in a segment. In one embodiment, the components are broken into events and containers, and are displayed in a list as part of a user interface.

Next, a canvas is displayed 1120 for defining the segment, by allowing placement of components onto the canvas to form rules. If the user wants to create a new segment, the canvas displayed 1120 is blank. If the user wants to edit an existing segment, the canvas is populated with the components for the existing segment, for example by loading the segment, e.g., from memory. In one embodiment, there may be more than one canvas, for example, one canvas for including rules and one for excluding rules.

The next step is receiving input for modification of the segment 1130. In various embodiments, modifying the segment may include dragging and dropping components to a canvas, defining components, and deleting rules. In one embodiment, the components may be added in combination as either AND or OR combination operations. Following modification, 1130, modified segments are displayed 1140, e.g., via a user interface. The user may perform other tasks on the segments as well, such as saving the segment and clearing the canvas button. In addition, the user can choose to apply 1150 the segment to stored data.

Figure 3:
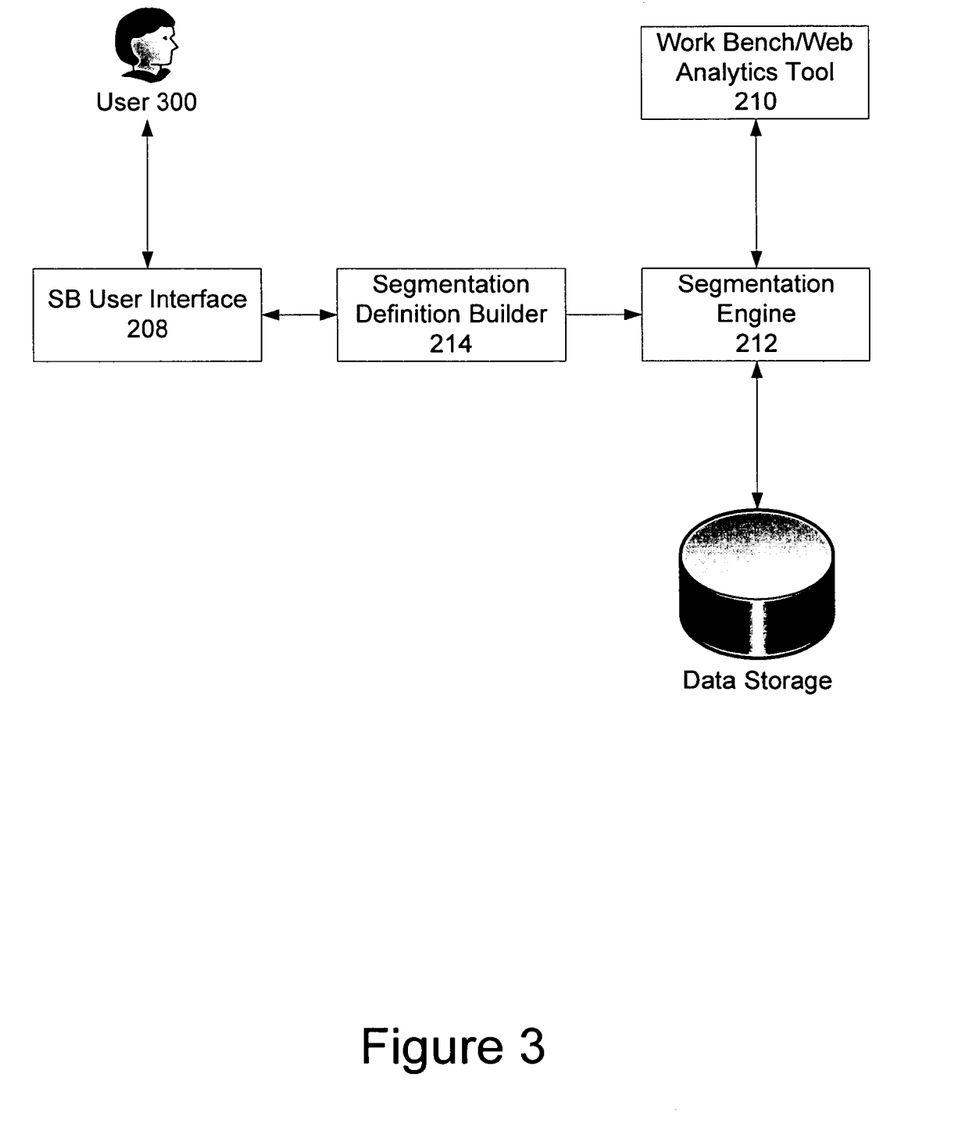
FIG. 3 is a block diagram representation of the interaction of the present invention in a web analytics system.

Referring now to FIG. 3, a block diagram showing the interaction of the components of present invention in a web analytics system will be described. The segmentation builder user interface module 208 presents a interface that allows a user 300 to input data that is sent to the segmentation definition builder 214 and used to create segmentation definitions. The segmentation builder user interface module 208 may also include a number of default segment definitions, or segment definitions previously created and stored by the user 300. The segmentation definition builder 214 creates or modifies a segment definition and then provides the definition to the segmentation engine 212 along with instructions to create a data set and data source upon which to apply the segmentation definition. The segmentation engine 212 uses these inputs to generate a data set that is then provided to the workbench of a web analytics tool 210. The data set can then be further manipulated by the web analytics tool 210 for the creation of reports, display to the user, tracking, targeting, and notification of users based on the data.

Figure 4:
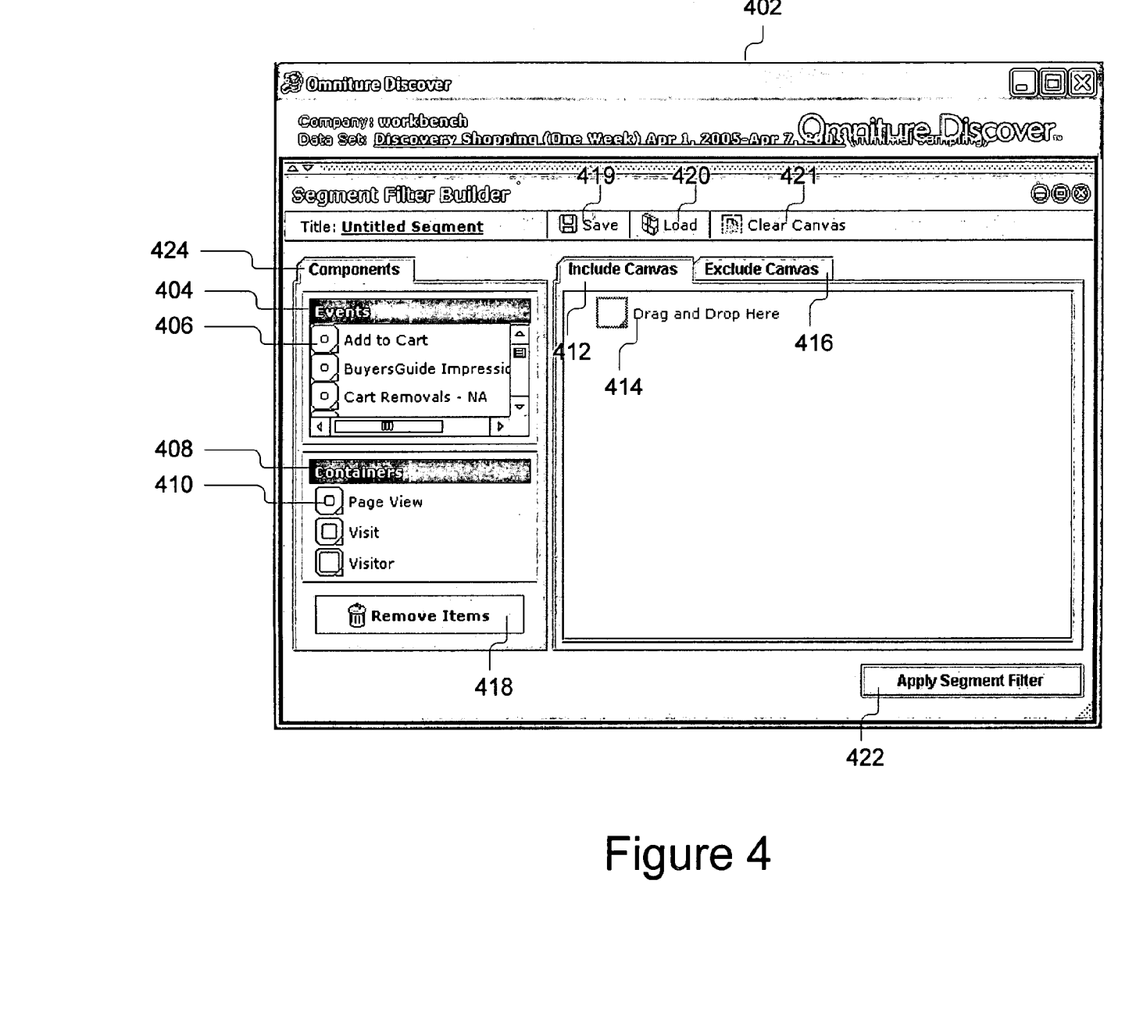
FIGS. 4-8 are graphical representations of the user interface of the present invention.

Referring now to FIGS. 4-8, one embodiment of a user interface 402 will be described in detail. FIG. 4 illustrates a segment builder according to one embodiment of the present invention. The segment builder is produced by the segmentation builder user interface module 208 is a visual representation of segmentation criteria according to this embodiment. The segment builder allows for visual feedback that facilitates the understanding of a visit, visitor, or page view based segmentation criteria. Using the segment builder a variety of rules may be constructed that are used to filter the data from the data source. The segment builder includes a window 402 that includes a plurality of canvases 412, 416 according to one embodiment that are activated by the selection of tabs for example using a mouse. The canvases 412, 416 show in shadow an area 414 of the canvas 412 where criteria used for filtering can be dragged and dropped. The window 402 provides an area for drag-and-drop functionality in which components 424 (e.g., events 404 and containers 408 according to this embodiment) may be placed on the canvases 412, 416. The user interface 402 also includes a plurality of buttons 418-422, for performing various operations. A remove items button 418 is provided for, removing items from the canvas 412, 416. Selecting a component 424 on the canvas 412, 416 and clicking the remove items button 418 removes the selected component 424 from the canvas 412, 416. A save button 419, when clicked, saves a filter being created or modified. A load button 420, when clicked, loads an existing filter, e.g., by allowing the user to select a filter from a list. A clear canvas button 421, when clicked, clears the canvas 412, 416 of all components 424 displayed. Selecting a component 424 on the canvas 412, 416 and clicking the apply segment filter button 422 applies the selected segment filter. The user interface 402 also includes areas for components 424 such as containers 408 and events 404, which are typically variables that act as criteria by which the data may be filtered. There are three types of containers 408 as shown, but the events 406 may be any activity that occurs in a users visiting or viewing of web pages, and data criteria that is stored in a data storage.

The user interface 402 advantageous conveys this information using graphical bounding boxes or containers 410 according to one embodiment. The bounding boxes may be displayed in a visually distinct manner to reflect different types of containers. For example, different colors or different icons may be used to represent different types of containers. Moreover, the containers may vary in sized depending on the number of rules they contain, the number of other containers they contain and other factors upon which filtering is occurring.

Figure 5:
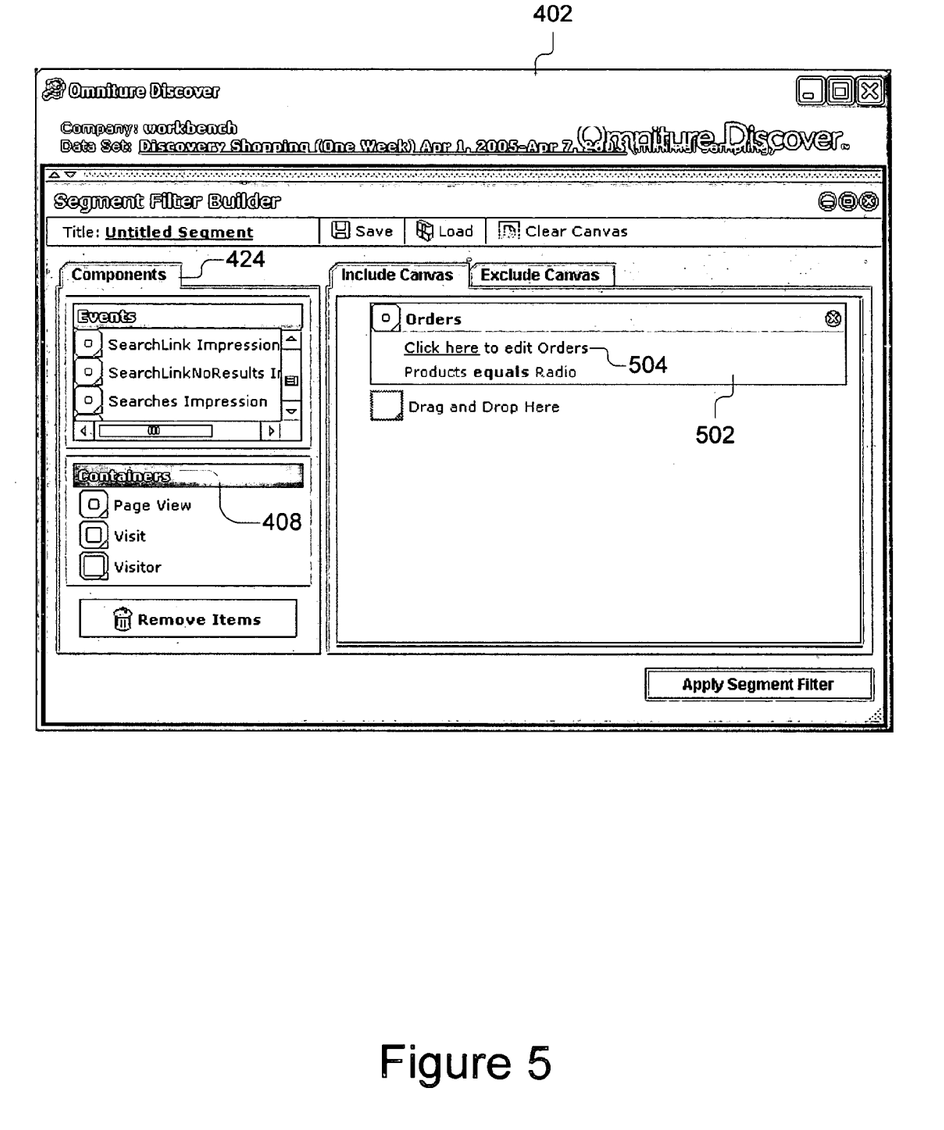

The window of FIG. 4 shows the elements described above on a blank canvas 412, 416, to which no rules have been applied. The user interface 402 advantageously has two canvases 412, 412; one canvas 412 for rules defining what data should be included, and another canvas 416 for rules defining what data should be excluded. Both canvases 412, 416 can have rules and if both do, both rules will be applied. Components 424 may be dragged and dropped into the canvases 412, 416, e.g., by using a mouse or other similar device, according to one embodiment Referring now to FIG. 5, the user interface 402 is shown with a rule 502 added to canvas 412. FIG. 5 illustrates an example of a very simple rule indicating that the user wants Orders where product equals radio. This rule will return ONLY the actual orders for which that criterion was true. As can be seen, the rule 502 is represented as a bounding box captioned with Orders, indicating that Order is criteria upon which filtering is occurring.

Figure 9:
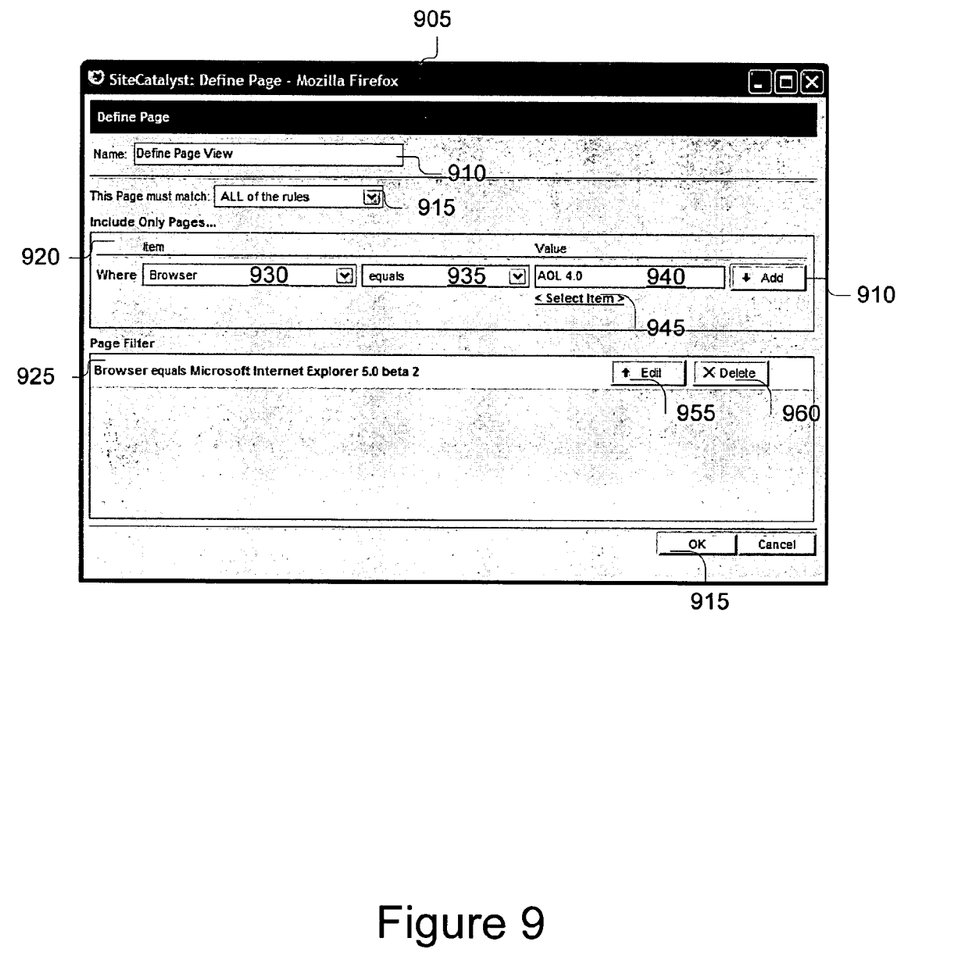
FIG. 9 is a graphical representation of a define component screen of a graphical user interface according to one embodiment of the present invention.

The rule 502 includes a define/edit selector 504. When a component has not yet been defined, the define/edit selector 504 displays as Click here to define <component>, and the data returned is all data for the component 424. When a component has been defined, the define/edit selector 504 displays as Click here to edit <component>. Upon clicking the define/edit selector 504, the user can define or edit attributes to be included in a component 424. Clicking the define/edit selector 504 opens a define component screen 905.

Referring now to FIG. 9, a define component screen 905 is shown according to one embodiment of the present invention. The example displayed is for a Page View type of container 410, thus the define component screen 905 displays Define Page. The define component screen 905 includes a name field 910, a match selector 915, a definition area 920, and a filter list 925.

The name field 910 allows the user to type a name for the canvas element. The match selector 915 allows the user to select whether the element will match "all" or "at least one" of the rules. The definition area 920 allows the user to define a text string, e.g., 804-808 as described in conjunction with FIG. 8. The filter list 925 displays filters once they've been selected from the definition area 920.

The definition area 920 further includes an item selector 930, an operator selector 935, a value selector 940, a select item link 945, and an add button 950. The item selector 930 allows the user to select an item from a list, for example a drop down menu. Examples of items include "Browser," as shown in FIG. 9, Cookies, Visit Number, Products, etc., as appropriate for the type of container 410. The operator selector 935 allows the user to select an operator to apply to the item. In one embodiment, the operators include equals, is greater than, is less than, is greater than or equal to, is less than or equal to, contains, contains all of, and contains at least one of.

Figure 10:
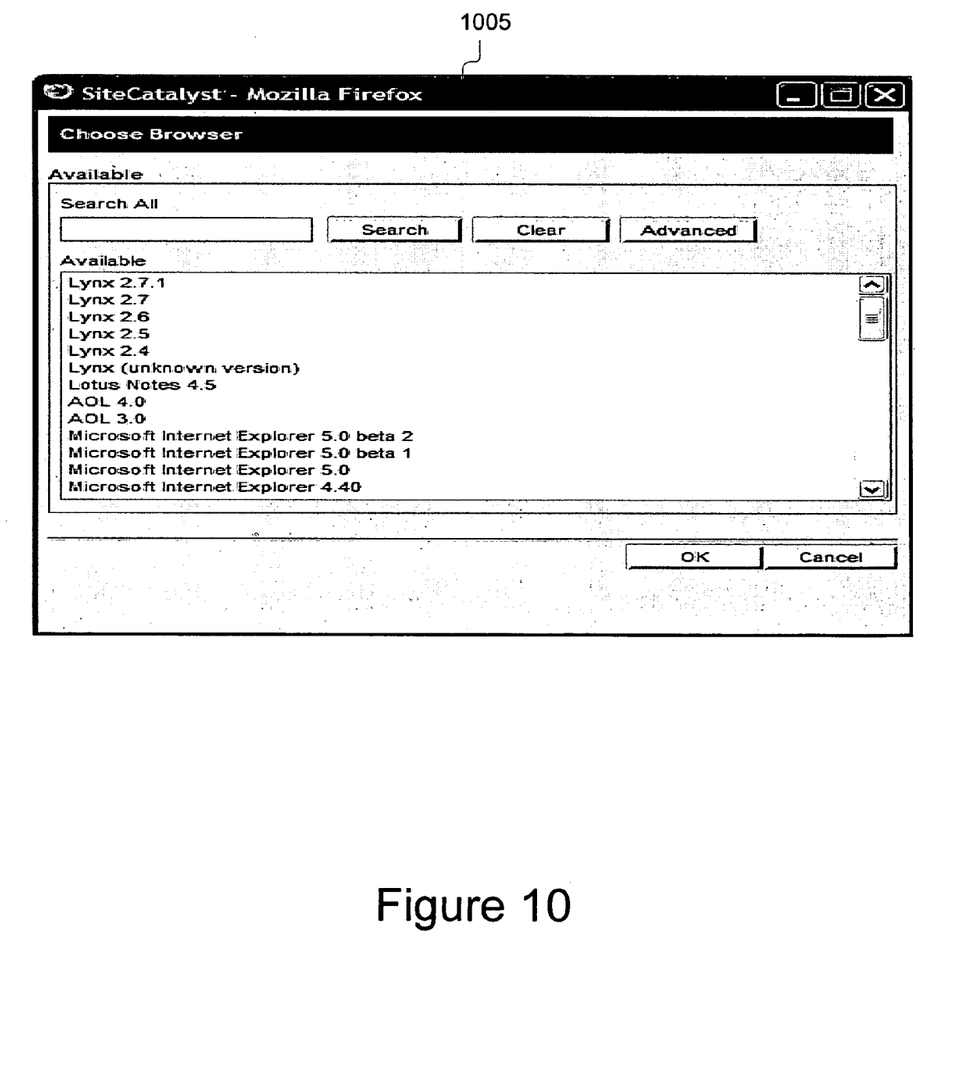
FIG. 10 is a graphical representation of a choose value screen of a graphical user interface according to one embodiment of the present invention.

The value selector 940 allows the user to select a value to apply to the item. The user can type in a value or can select from a list using the select item link 945. Clicking the select item link 945 opens a choose value screen 1005, such as shown in FIG. 10. This example is a choose browser screen, as the item selected from the item selector 930 was browser. Selecting a value from the choose value screen 1005 populates the value selector 940 with the selected value.

Referring again to FIG. 9, the add button 950 adds the item described by selectors 930-940. Once an item is added, it is displayed in the filter list 925. The filter list 925 includes, for each item, an edit button 955 and a delete button 960 for editing or removing items in the list 925. Selecting the edit button 955 returns the user to the definition area 920. The user can add multiple items to the list 925 using the selectors 930-940. The user selects the OK button 965 to return to the user interface 402.

Referring again to FIG. 5 the example shown is a rule 502 displaying the string "Product equals Radio," and the component is Orders, so the define/edit selector 504 displays Click here to edit Orders.

Figure 8:
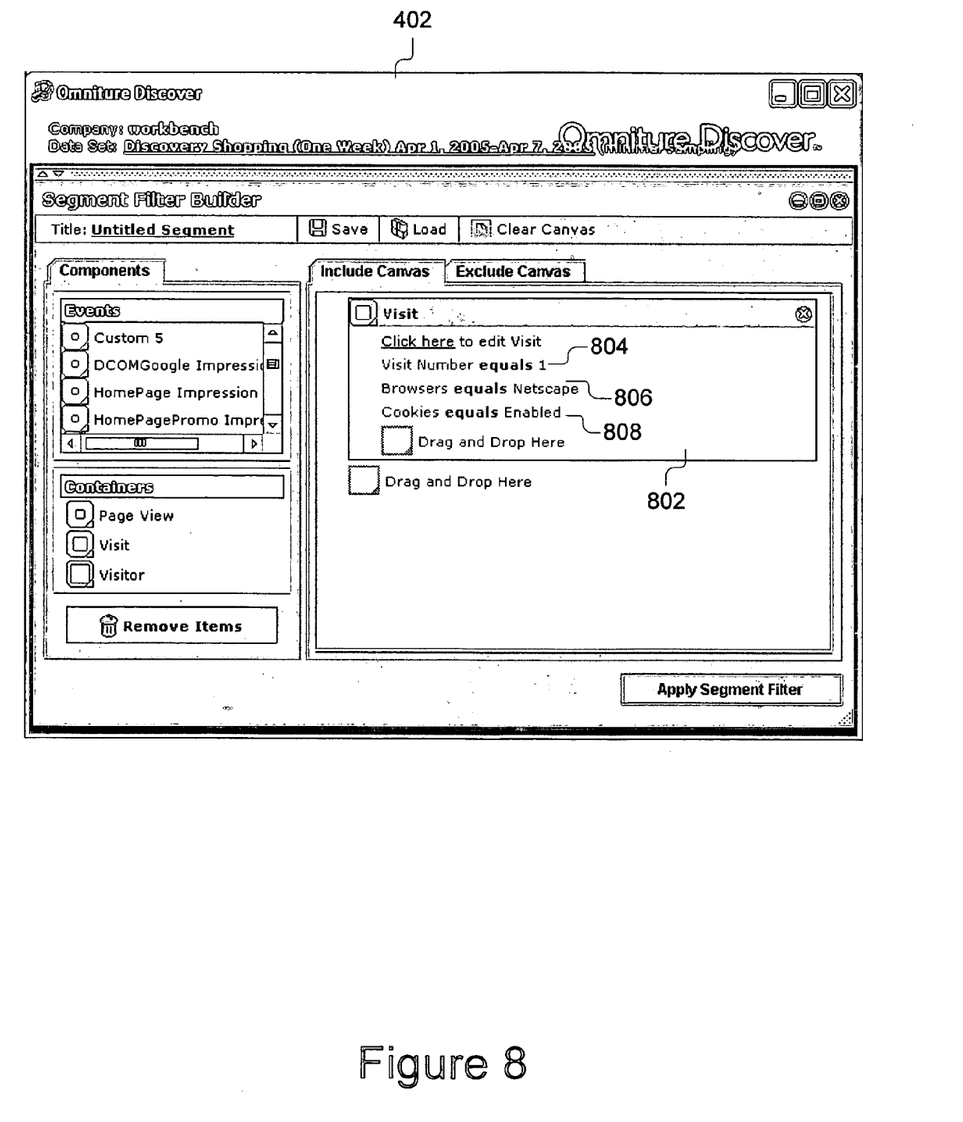

The user interface allows any number of attributes of a component 424 to be included as variables in the text string and allows any logical, numerical, or Boolean operator between attributes and values. Multiple variables also can be combined within a single rule according to one embodiment. FIG. 8 shows a user interface with a Visit rule 802 in which three variables for a visit, shown as strings 804, 806, 808, have been combined. As shown in FIG. 8, the rule 802 would return all pages for any visit that was visit number 1, with cookies enabled, and Netscape as the browser.

Figure 6:
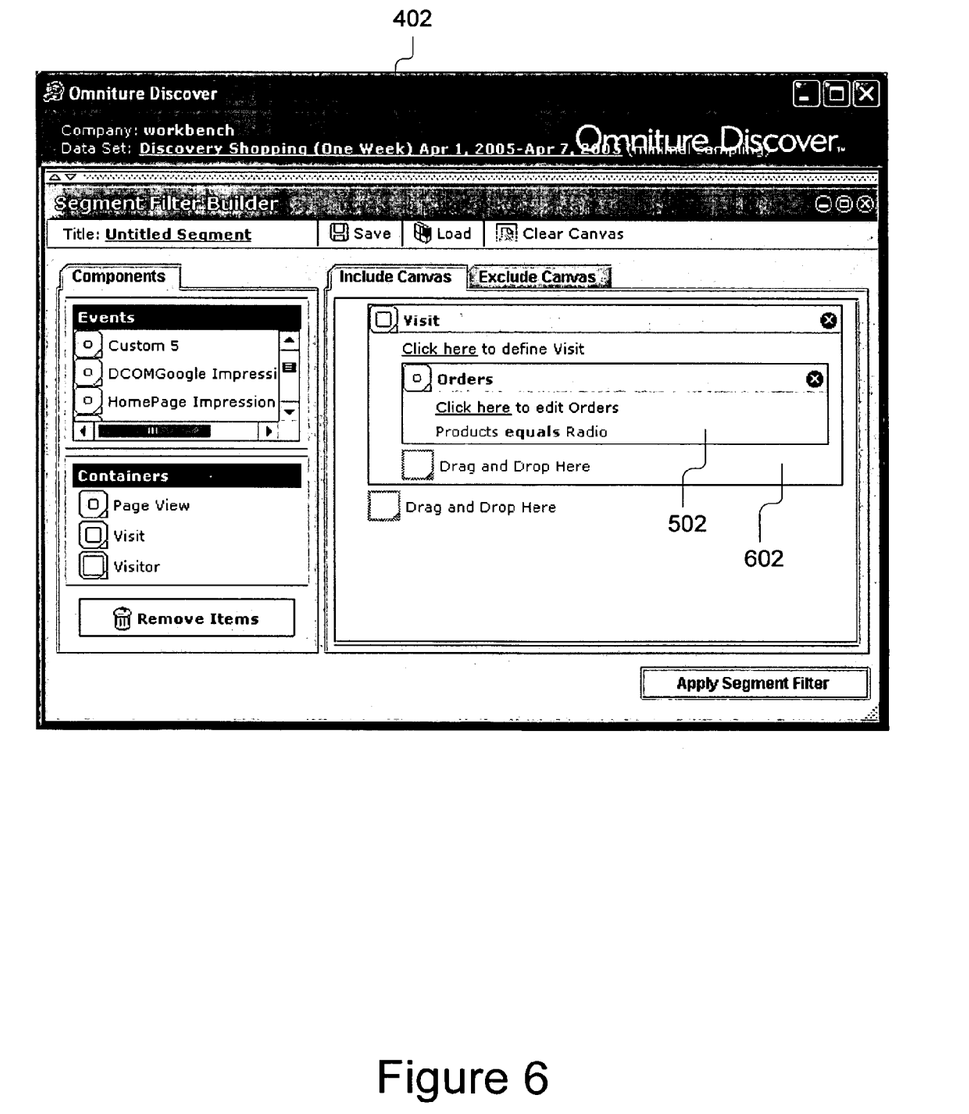

Referring now to FIG. 6, the user interface 402 shows the same rule 502 but with another rule 602 added. To make this example more complex, a Visit category component 602 is added. This means that this segment will not only return the orders where product equals radio, but will also return all pages that were a part of the visit in which the product equaled radio. The user interface 402 is particularly advantageous because the relationship between Visits and Orders is shown, wherein the Order box 502 is within or inside the Visits box 602. Since the containers 502, 602 are nested, the segment definition provides AND operator functionality for all pages for visits in which the Order meets the criteria. This is advantageous because the nesting relationship between containers 502, 602 provides an indication to the user what data will be returned. Moreover, the manipulation of containers 502, 602 is such that the placement of new or additional containers or components can be easily specified by dragging and dropping into the shaded areas where the caption "Drag and Drop Here' is shown. As can be seen from the Containers pallet 408, Visitors also can be added as a component 424.

Figure 7:
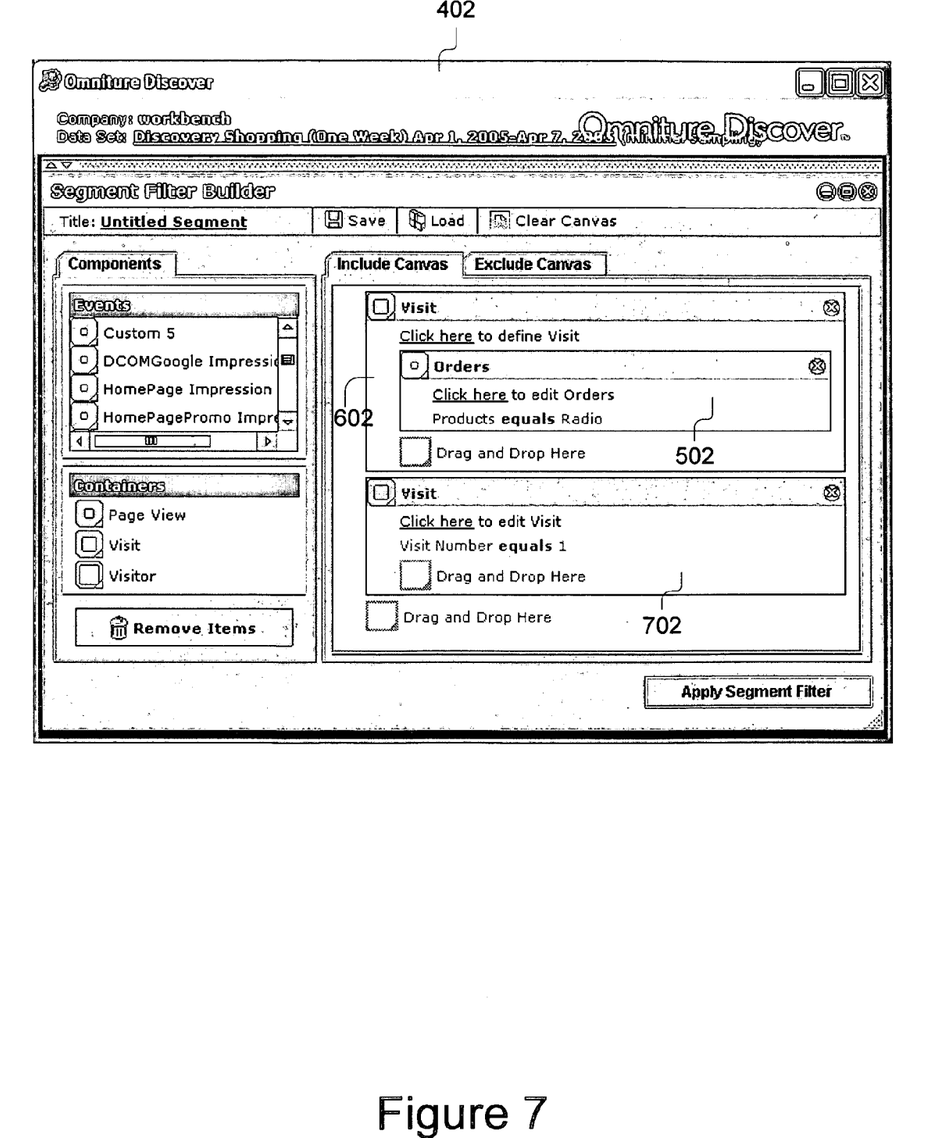

Referring now also to FIG. 7, the user interface 402 shows the same rules 502, 602 with yet another rule 702 added. To make things more complex, a second Visit rule 702 is added and shown as an additional box 702. Any number of additional boxes/components 424 can be added according to one embodiment. For example as shown in FIG. 7, the same rule 502, 602 (Visits where an order for a radio occurred) is present, but an additional box 702 of Visits where Visit number equals 1 has been added. Since these boxes 602, 702 are not nested, it means that data is returned when either is true—this is an OR combination. Alternatively, if the user 300 had applied the visit number equals 1 rule 702 to the original visit box it would mean that both visit number equals 1 and product equals radio had to occur within the same visit, or an AND combination as described above. In one embodiment, components also can be excluded using the exclude canvas 116, e.g., to exclude visits, visitors, etc.

Figure 12A:
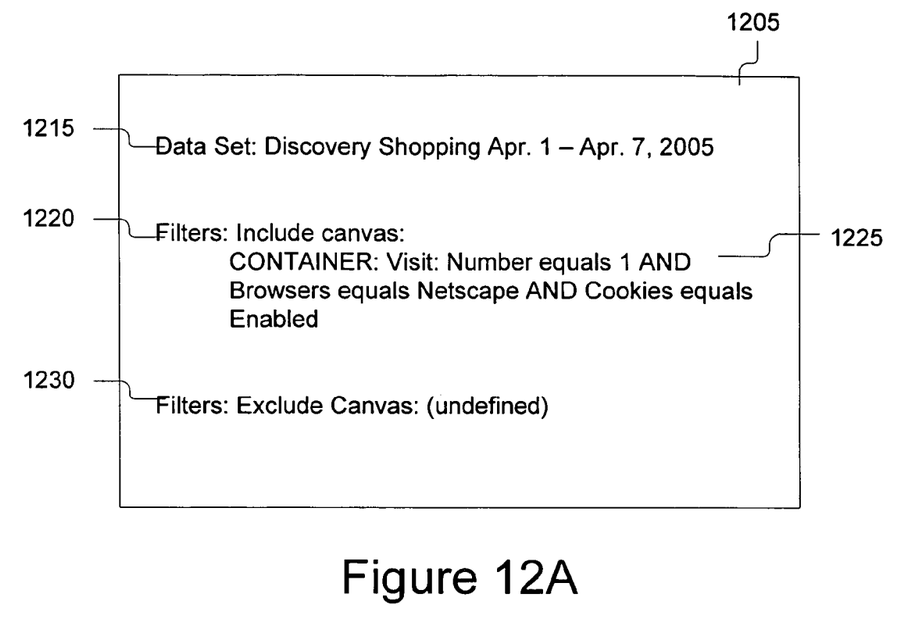
FIGS. 12A and 12B show a text-based interface according to one embodiment of the present invention.
Figure 12B:
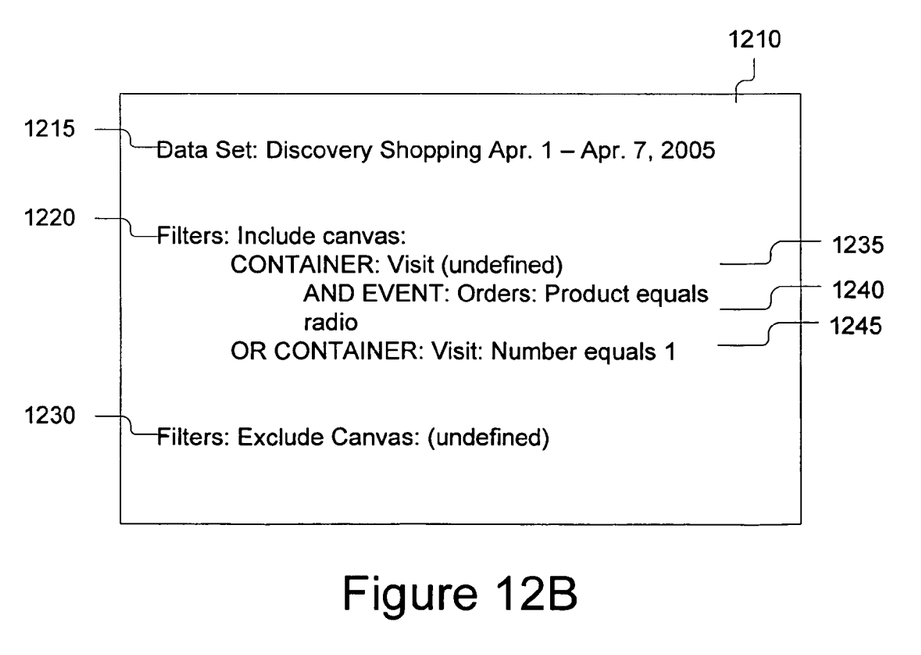

FIGS. 12A and 12B show a text-based interface according to one embodiment of the present invention. FIG. 12A shows a text-based interface 1205 with a Visit rule 1225 in which three variables for a visit have been combined as an AND function. This interface 1205 displays a data set 1215, and canvases 1220, 1230, including the same information as the graphical user interface of FIG. 8. As shown in FIG. 12A, the rule 1205 would return all pages for any visit that was visit number 1, with cookies enabled, and Netscape as the browser.

FIG. 12B shows a text-based user interface 1210 shows with rules 1235-1245, similar to those shown in FIG. 7. A Visit rule 1235 with a Order rule 1240 for which product equals radio is shown, joined as an AND combination. In addition, a Visit rule 1245 for which visit number equals one is shown. The interface 1210 indicates that the two visit rules 1235, 1245 are joined as an OR combination.

The text-based user interfaces 1205, 1210 shown are particularly advantageous because the relationships between containers and events in the hierarchy are shown, along with whether they are combined as AND and/or OR functions.

Workflow

The following is a description of interface functionality for defining a rule for filtering website visitation data according to one embodiment of the present invention in the context of FIGS. 4-8.

Beginning with blank canvases 412, 416 as shown in FIG. 4, the user drags and drops a component 424, e.g., an order event 406, to one of the canvases 412, 416. One such order event 502 is shown in FIG. 5. The user then clicks on the define/edit selector 504, and defines the event 502 using a define component screen 905 as shown in FIG. 9. A text string associated with the item defined by the define component screen 905 is then displayed as shown in FIG. 5. Next, the user may continue to add other components 424 by dragging and dropping them. If the user drags and drops a component 424 so that it is nested with an existing rule, e.g., as shown with rule 602 of FIG. 6, the rules are combined as an AND combination. If the user drags and drops a component 424 so that it is not nested with an existing rule, for example into the drag and drop area 414 depicted in FIG. 4, as shown for rule 702 of FIG. 7, the rule is combined as an OR combination with the existing rule(s) (502, 602). If the user wants to delete a rule, the user selects the rule, e.g., rule 602 (and 502, the nested rule), and clicks the remove items button 418. The result is that rule 702 is the only rule displayed on the canvas 412. Alternatively, the user can edit an existing segment. To edit, the user selects the load button 420, and selects an available segment from a list (not shown). The loaded is finished selecting and editing rules, the user can save the segment may be edited using any of the above described actions.

When the user segment by clicking the save button 419. The user can also apply the segment by selecting the apply segment filter button 422. If the user wants to start over, the user clicks the clear canvas button 420, which returns the user to the blank canvases 412, 416 shown in FIG. 4.

Thus, those skilled in the art will recognize how the above user interface shown in FIGS. 4-8 can be used by non-technical personal to create and apply new segment definitions to web analytic data.

While the present invention has been described with reference to certain embodiments, those skilled in the art will recognize that various modifications may be provided. For example, certain embodiments may employ multiple application servers, acting in cooperation to perform a function or request. Any of the above functions or requests can be sent across a network. Variations upon and modifications to the described embodiments are provided for by the present invention.

We claim:

1. A method of defining a segment for filtering website visitation data, comprising:
    displaying, using a display device, a plurality of events and containers as criteria for filtering website visitation data describing visitor traffic data from use of a website;
    displaying a canvas for defining a segment, the canvas defining one or more rules for the segment by which to filter the website visitation data, using the display device;
    receiving user input from a keyboard or a cursor control device selecting a first of the plurality of events and containers to include in the segment; and
    displaying on the canvas the first of the plurality of events and containers via the display device.

2. The method of claim 1, further comprising:
    receiving user input selecting a second of the plurality of events and containers to include in the segment; and
    displaying on the canvas the first and second of the plurality of events and containers.

3. The method of claim 2, wherein the first and second of the plurality of events and containers are nested.

4. The method of claim 2, wherein the first and second of the plurality of events and containers are combined using an AND operation.

5. The method of claim 2, wherein the first and second of the plurality of events and containers are combined using an OR operation.

6. The method of claim 2, wherein the events and the containers are visually distinct.

7. The method of claim 1, wherein the canvas comprises two-parts, a first part for events and containers to include in the rule and a second part for events and containers to exclude from the rule.

8. The method of claim 1, wherein receiving user input selecting a first of the plurality of events and containers to include in the segment further comprises dragging and dropping the first of the plurality of events and containers to the canvas.

9. The method of claim 1, further comprising applying the segment to the website visitation data.

10. A method of editing a segment for filtering website visitation data, comprising:
    displaying, using a display device, a plurality of events and containers as criteria for filtering the website visitation data describing visitor traffic data from use of a website;
    receiving from a keyboard or a cursor control device user input loading an existing segment comprising a set of existing events and containers;
    displaying, using the display device, a canvas for editing the existing segment, the canvas defining one or more rules of the existing segment by which to filter the website visitation data;
    receiving user input from the keyboard or from the cursor control device to modify the set of existing events and containers in the existing segment; and
    displaying, using the display device, on the canvas the set of existing events and containers as modified.

11. The method of claim 10, wherein the set of existing events and containers as modified are nested.

12. The method of claim 10, wherein the existing events and containers are combined using an AND operation.

13. The method of claim 10, wherein the set of existing events and containers are combined using an OR operation.

14. The method of claim 10, wherein receiving user input to modify the set of existing events and containers in the existing segment further comprises dragging and dropping a first of the plurality of events and containers to the canvas.

15. The method of claim 10, further comprising applying the existing segment as modified to the website visitation data.

16. A computer readable storage medium storing a computer program executable by a processor, the computer program defining a segment for filtering website visitation data, the computer program executing the steps of:
    displaying a component area including a plurality of events and containers as criteria for filtering the website visitation data describing visitor traffic data from use of a website may be filtered; and displaying a canvas for defining a segment, the canvas defining one or more rules for the segment by which to filter the website visitation data;

receiving a user input selecting a first of the plurality of events and containers to include in the segment; and displaying the first of the plurality of events and containers on the canvas.

17. The computer readable storage medium of claim 16, wherein selected of the rules are nested.

18. The computer readable storage medium of claim 16, wherein the plurality of events and containers are visually distinct.

19. The computer readable storage medium of claim 16, wherein the canvas comprises two-parts, a first part for events and containers to include in the rule and a second part for events and containers to exclude from the rule.

20. The computer readable storage medium of claim 16, further comprising:

receiving a load input from a load button for loading an existing segment comprising a set of existing events and containers; and displaying the existing segment on the canvas.

* * * * *